United States Patent [19]

Ferris et al.

[11] 4,368,006
[45] Jan. 11, 1983

[54] DROOP STOP FOR FULLY ARTICULATED ROTOR

[75] Inventors: Donald L. Ferris, Newtown; Robert C. Rybicki, Trumbull, both of Conn.

[73] Assignee: The United States of America as represented by the Secretary of the Navy, Washington, D.C.

[21] Appl. No.: 176,151

[22] Filed: Aug. 7, 1980

[51] Int. Cl.³ .............................................. B64C 27/40
[52] U.S. Cl. ................................ 416/140; 416/134 A
[58] Field of Search ................. 416/140, 134 R, 134 A

[56] References Cited

U.S. PATENT DOCUMENTS

| 2,151,215 | 3/1939 | Larsen | 416/140 A |
| 2,614,640 | 10/1952 | Buirid | 416/140 A |
| 2,628,686 | 2/1953 | Buirid | 416/140 A |
| 2,928,478 | 3/1960 | DuPont | 416/140 A |
| 3,533,713 | 10/1970 | Salmun | 416/140 A |
| 3,778,189 | 12/1973 | Ferris | 416/140 A |
| 3,853,426 | 12/1974 | Rybicki | 416/140 A |
| 3,932,059 | 1/1976 | Rybicki | 416/140 A |
| 4,131,391 | 12/1978 | Robinson | 416/140 A |
| 4,203,708 | 5/1980 | Rybicki | 416/140 A |

FOREIGN PATENT DOCUMENTS

| 64262 | 10/1949 | Netherlands | 416/140 A |
| 107604 | 6/1943 | Sweden | 416/140 A |

*Primary Examiner*—Everette A. Powell, Jr.
*Attorney, Agent, or Firm*—R. F. Beers; P. C. Lall

[57] ABSTRACT

An improved droop stop for a fully articulated helicopter rotor is provided wherein curved mating surfaces are employed between the spindle pad and the centrifugal droop stop static support arm to provide surface rather than line contact therebetween during centrifugal operation. The centers of the curved surfaces are coincident at the pivot point of the droop stop centrifugal arm to force the downward load of the blade to pass through this pivot point.

1 Claim, 5 Drawing Figures

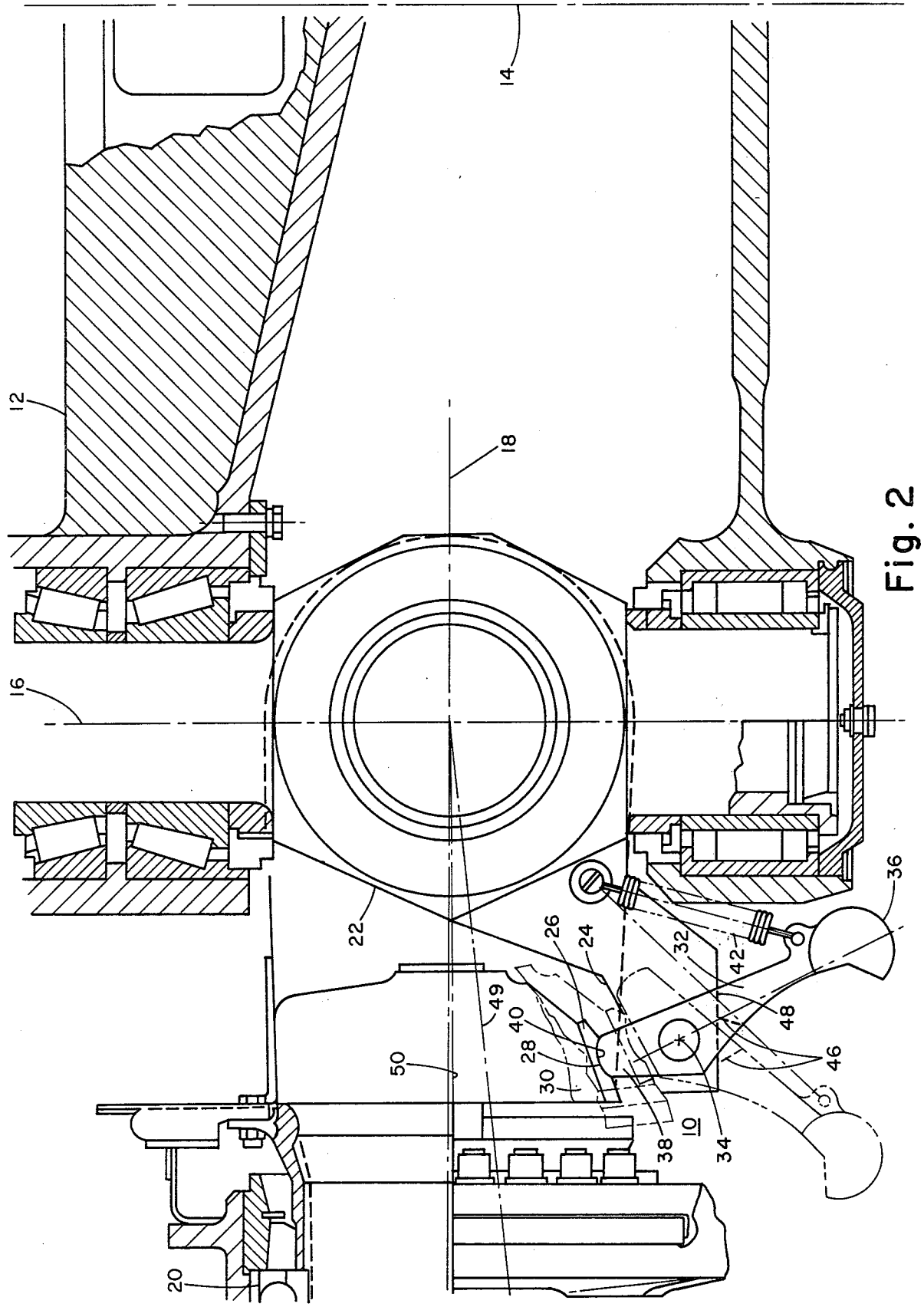

DROOP STOP FOR FULLY ARTICULATED ROTOR

BACKGROUND OF THE INVENTION

This invention relates to droop stop mechanisms for use with fully articulated rotary wing aircraft and, more particularly, to such mechanisms that are virtually jam proof and substantially resistant to flapping induced damage.

When at rest or slowly rotating, helicopter blades droop downwardly to such an extent that, but for the provision of a mechanism stopping the droop, the tips of the blades would damage the fuselage and tail cone structures.

Rapidly rotating blades, however, are not subject to this danger. Whenever the blades are rapidly rotating, centrifugal and aerodynamic forces straighten the blades and eliminate the possibility of the tips being brought into damaging contact with the helicopter's fuselage. Accordingly, in the flight state, a comparatively larger degree of droop is permitted about the flapping axis of a fully articulated rotor than in the rest or slowly rotating (i.e., ground) state.

Droop stop mechanisms are designed to allow the larger degree of blade motion about the flapping axis in the flight state relative to that permitted in the ground state, as above described, and typically include a spindle pad having a flat bearing surface mounted to the root of blade connected structure; a vertical hinge having a flat bearing surface mounted to the rotor hub assembly and a pair of pendulum arms pivotally connected to the vertical hinge at a point intermediate its two ends. Each pendulum arm consists of a centrifugally responsive lower weighted end and an upper cam end having a flat bearing surface.

In operation, during the ground state, a spring and cooperating stop bias the flat bearing surface of the cam ends of the pendulum arms into upwardly supporting alignment with the flat bearing surface of the spindle pad such that a blade resting thereon is substantially horizontal. Damaging contact of the blade tips with the fuselage and tail cone structures is thereby effectively eliminated. During the flight state, a stop limits the clockwise rotation of the centrifugally responsive lower weighted ends of the pendulum arms such that the flat bearing surface of the vertical hinge acts as a dynamic droop stop upon which abuts the flat bearing surface of the spindle pad; this provides the larger degree of blade motion about the flapping axis permitted rapidly rotating blades. A droop stop mechanism of similar function is shown by U.S. Pat. No. 2,614,640 issued to Buivid.

However, whenever the pendulum arms are changing between the ground (flight) and the flight (ground) positions, the cam ends of the pendulum arms can jam if one of their corners is stuck by the flat bearing surface of the spindle pad. In such cases, as discussed more fully below in the detailed description of the invention, aerodynamically and inertially induced moments about the flapping axis may buildup to such an extent as to become potentially very damaging to the droop stop mechanism.

Accordingly, it is an object of this invention to provide a droop stop mechanism that is virtually jam proof and substantially resistant to flapping induced damage.

Another object is to provide a droop stop mechanism having full surface bearing contact for reacting blade moments over a wide range of cam angular rotation.

It is a related object to provide an improved droop stop mechanism which readily disengages whenever cam angular rotation is insufficient to provide adequate contact area for reacting blade moments.

An additional object is to provide a droop stop mechanism in which no moments are built-up about the pivot points of the pendulum arms.

SUMMARY OF THE INVENTION

These and other objects are accomplished by providing an improved droop stop mechanism for use with a fully articulated rotary wing aircraft that is virtually jam proof over the entire range of cam angular rotation and substantially resistant to flapping induced damage. The improved droop stop mechanism of the present invention has mated, curved bearing surfaces on the spindle pad and cam ends of the pendulum arms. The radii of curvature of the curved cam ends of the pendulum arms and the curved bearing surfaces of the spindle pad are coincident at the pivot points of the pendulum arms to direct the downward loading of the blade to pass through the pivot points. The like curvatures of the bearing surfaces result in full surface, rather than line, contact over a wide range of cam angular positions, virtually eliminating the possibility of jamming.

A second shaped, or ramped, surface is provided inboard of the spindle pad curved bearing surface which substantially precludes the buildup of moments and frictional jamming forces as the mated, curved surfaces of the spindle pad and cam ends of the pendulum arms rotate out of upwardly supporting engagement during centrifugal operation. The shaped surface is positioned to contact the cam ends of the pendulum arms over the remainder of the range of cam angular rotation at an angle $\theta$ such that the tangent of the angle $\theta$ exceeds the coefficient of friction of the contacting bearing surfaces.

Other objects, advantages and novel features of the invention will become apparent from the appended claims and the following detailed description when considered in conjunction with the following drawings, in which like numerals represent like parts throughout, and wherein:

FIG. 2 is a partial side view of an articulated helicopter rotor, in part broken away for illustration, showing the improved droop stop mechanism in its ground and flight positions;

DETAILED DESCRIPTION OF THE INVENTION

Figure 1:
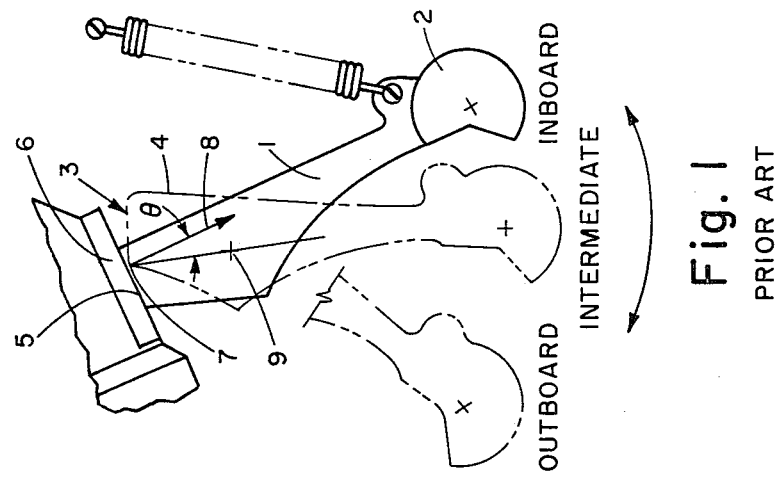
FIG. 1 is an isolated view of a prior art droop stop mechanism.

In prior art droop stop mechanisms as described in the background of the invention, several difficulties may be encountered. Referring now to FIG. 1, which shows the design of a prior art droop stop mechanism, whenever the centrifugally responsive lower weighted ends 2 of pendulum arms 1, one of which is shown, are moving either inboard due to a decay of rotor speed or outboard due to an increase of rotor speed, flat bearing surfaces 3 of cam ends 4 of the pendulum arms 1 are not parallel to flat bearing surface 5 of spindle pad 6. During this intermediate state of partial cam angular rotation, outboard corners 7 of the cam ends of the pendulum arms may bear as a line contact against the flat bearing surface of the spindle pad.

It often happens in such situations that, as a result of flight operations including lift vectoring and ground taxiing, a downwardly directed aerodynamically induced flapping force, as represented at 8, acts to frictionally jam outboard corners 7 of the cam ends of the pendulum arms against the spindle pad's flat bearing surface 5. FIG. 1 depicts the relatively small contact angle $\theta$ that is formed between the line of action of the force 8 and the line between the corners 7 and pivot point 9. As the downward loading of the droop stop mechanism increases at the small angle $\theta$, damage in one form or another can occur. Either the high compression force 8 will crush and yield the corners 7 and pad 6 or, as is more often the case, the downwardly directed aerodynamically induced flapping force 8 effects a moment about pivot 9 of magnitude sufficient to overcome the jamming frictional force, which moment instantaneously releases the cam ends from frictional engagement. The large amount of stored energy thus released drives the bottom weighted ends of the pendulum arms either inboard or outboard toward their limit stops at an accelerated rate very much greater than planned. This high acceleration and sudden deceleration creates very high inertial loading which tends to bend and fracture the pendulum arms and associated mounting hardware.

In overcoming the difficulties associated with the prior art device, our invention substantially eliminates blade loading moments on the droop stop mechanism over a wide range of cam angular rotation and provides such a large contact angle for the remainder of the range of cam angular rotation that resulting blade loading moments of relatively small magnitude easily disengage the cam ends and spindle pad thereby avoiding damage. As described in greater particularity hereinafter; mated, curved bearing surface contact is provided between the curved cam ends of the pendulum arms and the curved outboard bearing surfaces of the spindle pad to direct the downward loading of the blade to pass through the common center of the contacting curved bearing surfaces over that range of cam angular rotation having full surface contact. Whenever surface contact between the mated, curved bearing surfaces transitions to line contact over the remainder of the range of cam angular rotation, a second shaped or ramped surface is positioned inboard of the first curved bearing surface at such a large contact angle that blade loading moments of comparatively small magnitude result which act to readily disengage the contacting bearing surfaces preventing the buildup of potentially damaging moments.

FIG. 2 shows in cross section the improved droop stop mechanism 10 of the instant invention for use with one blade of a multiple blade fully articulated rotary wing aircraft. Each blade, not shown, is mounted to a hub assembly 12 for rotation about axis 14 with an upstanding drive shaft, also not shown. Each blade is mounted in hub 12 such that lead-lag motion is permitted about axis 16. Flapping motion is permitted about axis 18 and pitch change motion is permitted about pitch change bearings 20.

The axis 16 includes a vertical hinge 22 having an outwardly projecting abutment 24. Positioned above abutment 24 is spindle pad 26 having a bearing surface 28 fixably mounted to the root of blade connected structure 30. A pair of pendulum arms 32, one of which is shown, are pivotally connected at 34 to vertical hinge 22 at a point intermediate its ends. Each arm includes a lower centrifugally responsive fly weight 36 and an upper support arm cam end 38 having a curved bearing surface 40. A pair of tension springs 42, one of which is shown, are connected at one of their ends to vertical hinge 22 and at the other of their ends to pendulum arms 32.

The confronting inner faces of arms 32 carry stops 46 which engage the bottom portion 48 of the vertical hinge 22 in the extreme positions of these arms under the action of springs 42 in one direction and centrifugal force in the opposite direction.

Figure 3:
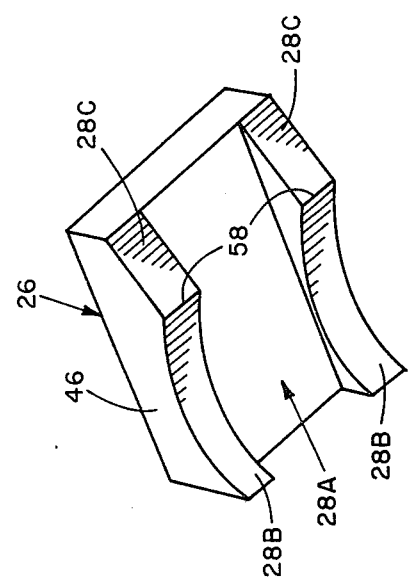
FIG. 3 is an isometric and enlarged view of the droop stop spindle pad shown in FIG. 2.

FIG. 3 shows an isometric and enlarged view of spindle pad 26. Bearing surface 28 of spindle pad 26 consists of an interior flat bearing surface 28A terminated on two sides by downwardly projecting arms 46 perpendicular to the plane defined by interior flat bearing surface 28A. Each arm includes outboard curved bearing surface 28B and inboard flat bearing surface 28C.

Referring now to FIGS. 2 and 3, the position in full line represents the ground (i.e., static or slowly rotating) state of droop stop mechanism 10 wherein curved bearing surfaces 40 of cam ends 38 of pendulum arms 32 are adapted, by action of the cooperation between springs 42 and stops 46, to rotatably mate and upwardly support outboard curved bearing surface 28B of spindle pad 26 such that a blade resting hereon is substantially horizontal as represented by line 50 of FIG. 2. The dynamic (i.e., flight) state of the droop stop mechanism 10, whenever the blades are rotating above a predetermined speed, is illustrated in phantom wherein abutment 24 of vertical hinge 22 acts as a dynamic droop stop upon which abuts bearing surface 28A of spindle pad 26 permitting rapidly rotating blades to flap through a maximum angle represented by dynamic droop plane 49.

The arcs of both the curved bearing surfaces 40 of cam ends 38 of pendulum arms 32 and of outboard curved bearing surfaces 28B of spindle pad 26 are mating circular segments of circles centered at the pivot points 34 of the pendulum arms. The length of the mating circular segments are such as to permit full surface contact over a wide range of cam angular rotation, typically from 20° to 40°. As more fully described below, flat bearing surface 28C is positioned above abutment 24 such that over the remainder of the range of cam angular rotation the cam ends 38 of pendulum members 32 readily disengage the flat bearing surface 28C.

Figure 4:
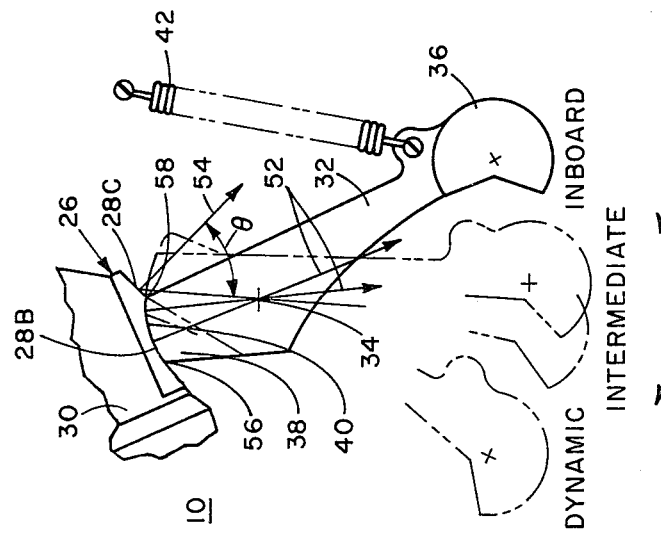
FIG. 4 is an isolated view showing the operation of the FIG. 2 improved droop stop mechanism.

In operation, referring now to FIG. 4, if the pendulum arms 32 are in the intermediate state having full surface contact between the mated, contacting bearing surfaces 40 and 28B, any aerodynamically and inertially induced downwardly directed blade loading is directed by the curvature and positioning of the mating bearing surfaces of the cam ends of the support arms and outboard bearing surface of the spindle pad to pass through pivot point 34, as shown at 52. This substantially eliminates the possibility of moment buildup and of frictional jamming between the contacting surfaces over the range of cam angular rotation having full surface contact between the mated, curved bearing surfaces.

With further angular motion, the cam arm bearing surfaces 40 are carried to an intermediate state beyond the position of full surface contact between the mated, curved surfaces. In this case, corners 56 of the cam ends 38 pass beyond curved surfaces 28B of spindle pad 26 and make line contact with flat surfaces 28C. The location of this transition point in spindle pad 26, the slope of surfaces 28C, and the location of pendulum pivot point 34 are coordinated such that contact angle $\theta$ illustrated relative to the line of action of blade force 54 is sufficiently large to disengage the contacting bearing surfaces. This large angle creates a large offset for force 54 from pivot point 34; the resulting small moment is sufficient to readily overcome the frictional force along surface 28C (not illustrated) and drives the cam arms 32 gently toward their limit stops without the adverse inertial loading and potential damage as encountered in the prior art small contact angle configuration described above.

Figure 5:
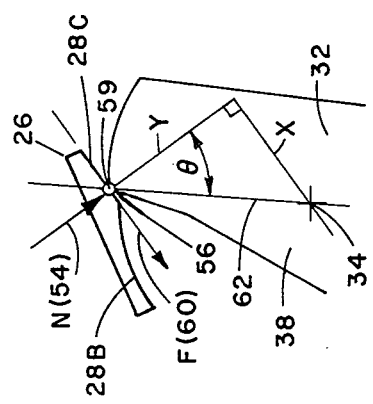
FIG. 5 is an isolated and enlarged view showing the operation of the spindle pad and cam end of the pendulum arm of FIG. 2.

Referring now to FIG. 5, which shows the forces operative on an enlarged fragmentary view of the droop stop mechanism in the intermediate state where outboard corner 56 of cam end 38 contacts flat bearing surface 28C of spindle pad 26, "N" represents the blade loading force 54 acting perpendicular to spindle pad surface 28C at a point of contact 59 of cam ends 38 and bearing surface 28C. "$\theta$" represents the angle of contact between the line defined by connecting pivot point 34 to contact point 59 and the line of action of blade loading force 54. "F" represents the frictional force 60 acting along surface 28C at contact point 59. "X" represents the perpendicular distance from pivot point 34 to the line of action of force 54 and "Y" represents the perpendicular distance from pivot point 34 to the line of action of the force 60.

In order for cam ends 38 to rotate out of contact with flat bearing surface 28C, the moment of the blade loading force 54 must exceed the moment of the opposing frictional force 60; otherwise, the mechanism would jam. This requirement may be written:

$$NX > FY. \quad (1)$$

The left and right hand sides of relationship (1) represent the moment of blade loading force 54 and the moment of frictional force 60, respectively, about pivot point 34 of the pendulum arms.

The frictional force, "F," acting along the contacting bearing surfaces is, by definition, equal to $\mu N$, where $\mu$ is the coefficient of friction between the bearing surfaces. Substituting this definition for "F" into (1) and rearranging:

$$X/Y > \mu. \quad (2)$$

Since the tangent of the contact angle $\theta$ equals the ratio X/Y, it follows from relationship (2) that by positioning the contacting bearing surfaces at an angle $\theta$ such that the tangent of the angle exceeds the coefficient of friction the bearing surfaces will readily disengage preventing the buildup of potentially damaging moments.

Many modifications and variations of the presently disclosed invention are possible. For example, the outboard curved bearing surface and inboard flat bearing surface may be formed as voids or indents along the spindle pad without the use of the downwardly projecting arms. In addition, the inboard bearing surface carried by the spindle pad need not be entirely flat, but may have either a trapezoidal or other suitable shape.

In summary, the present invention overcomes the deficiencies of the prior art droop stop mechanisms by providing mated, curved bearing surfaces between the spindle pad and cam ends of the pendulum arms for directing blade forces to the center of the curves over a wide range of cam arm angular rotation. A second shaped or ramped bearing surface on the spindle pad, positioned at an angle whose tangent exceeds the coefficient of friction between the contacting surfaces, assures jam free operation after cam angular rotation has resulted in disengagement of the contacting mated, curved surfaces.

It is to be understood that the invention disclosed is not to be limited to the exact details of construction shown and described.

We claim:

1. In a droop stop mechanism for a fully articulated rotary wing aircraft of the type having a rotor drive shaft, a hub rotatable by said shaft, and a blade pivoted in said hub for flapping movement about a flapping axis; said mechanism including a vertical hinge rotatable with said shaft and having an abutment beneath said blade, a spindle pad fixedly mounted at the root of said blade above said abutment, and a pendulum member pivotally connected as a point intermediate its ends on said vertical hinge in position to rotate by action of centrifugal force, said pendulum member having a fly weight on its lower end and a bearing surface on its upper cam end, said mechanism further including a tension spring connected at one of its ends to said vertical hinge and at the other of its ends to the lower end of said pendulum member, the improvement includes:

said blade mounted spindle pad having three contact surfaces comprising: a first generally flat surface acting as the dynamic stop; a generally cylindrical surface acting as the static stop; a second generally flat surface acting as a disengage means, wherein said second surface is contiguous with said generally cylindrical surface of said spindle pad with said cylindrical surface located relatively inboard; and a hub mounted pendulum member having two contact surfaces; a dynamic surface and a static surface; said dynamic surface being flat and in alignment to contact said first flat surface of said spindle pad, said static surface being generally cylindrical and in alignment to contact said generally cylindrical surface of said spindle pad with said two generally cylindrical surfaces having the radial center thereof the pivot point of said pendulum member wherein the transition point of said second flat surface and said generally cylindrical of said spindle pad is located to form angle with the line to the pivot point of said pendulum member and a line normal to said second flat surface of said spindle pad; and said angle having tangent thereof exceeding coefficient of friction of the droop stop contacting members.

* * * * *